H. W. PLEISTER.
CONDUIT OR CABLE CLAMP AND BRIDLE RING.
APPLICATION FILED OCT. 14, 1920.

1,381,234.

Patented June 14, 1921.

INVENTOR
Henry W. Pleister
BY Alan M Johnson
ATTORNEY

UNITED STATES PATENT OFFICE.

HENRY W. PLEISTER, OF WESTFIELD, NEW JERSEY, ASSIGNOR TO HENRY B. NEWHALL, EXECUTOR OF HENRY B. NEWHALL, SR., DECEASED.

CONDUIT OR CABLE CLAMP AND BRIDLE-RING.

1,381,234.  Specification of Letters Patent.  Patented June 14, 1921.

Application filed October 14, 1920. Serial No. 416,954.

*To all whom it may concern:*

Be it known that I, HENRY W. PLEISTER, a citizen of the United States, residing at Westfield, in the county of Union and State of New Jersey, have invented certain new and useful Improvements in Conduit or Cable Clamps and Bridle-Rings, of which the following is a specification, taken in connection with the accompanying drawings.

My invention relates to the combination of a conduit or cable clamp and a bridle ring, and also to a cable or conduit clamp and a bridle ring as subcombinations of the main combination, and as articles of manufacture.

My invention further relates to a cable or conduit clamp, which can be manufactured at minimum expense and to which a bridle ring may be secured either at the original installation of the cable and conduit clamp, or at any future time when it may be desirable to support one or more runs of bridle wires.

My invention further relates to a conduit or cable clamp provided with a pocket or recess arranged diagonally to the longitudinal axis of the clamp and adapted to coöperate with and hold the shank of a bridle ring inserted from the side.

More particularly my invention relates to such a conduit or cable clamp in which the diagonal pocket or recess is formed by stamping up a diagonal strap extending above the surface of the base.

My invention further relates to providing such a conduit or cable clamp with a tooth or wedge surface over which the shank of a bridle ring is sprung.

My invention further relates to a conduit or cable clamp which is preferably formed out of pressed sheet material, as pressed steel, or which may be formed from castings of malleable iron, brass, an alloy, aluminum or any other metal.

My invention further relates to certain combinations, subcombinations, articles of manufacture, and details of construction, all of which will be more fully hereinafter described and pointed out in the claims.

In the figures, in which I have shown one embodiment of my invention, the same reference numerals refer to similar parts in the several figures.

Figure 1:
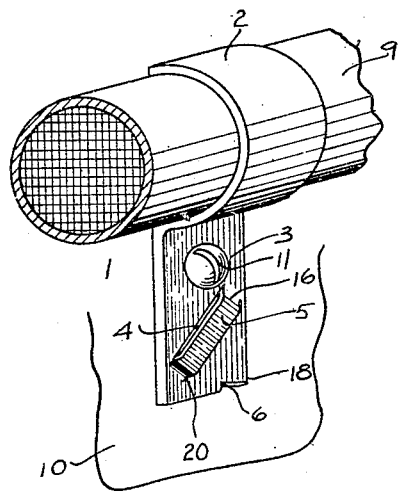
Figure 1 is a perspective view of my conduit or cable clamp and of a cable which it supports.

In the commercial use of conduit or cable clamps it is not generally possible, at the date of the original installation, to determine whether or not bridle rings will be needed to support additional loose strands of bridle wires. In commercial practice, a cable is supported on a wall or other suitable support and it may be weeks, months, or years later that the telephone engineers will determine that it is desirable to support bridle wires parallel to the cable.

By my invention my original conduit or cable clamp may be used as a separate article of manufacture or subcombination, and then later, when the needs of the service demand it, my bridle ring may be supported by the same conduit or cable clamp, when the complete combination would be used.

In my invention I form my conduit or cable clamp 1 with a hook portion 2 and a base 3. The base is provided with a diagonal pocket or recess 4, preferably formed by stamping up the diagonal strap 5 from the base 3, so that the strap extends above the surface of the base 3. I also preferably, though not necessarily, form a tooth or wedge surface 6 below the diagonal strap to coöperate with the shank 7 of the bridle ring 8. When the cable 9 is originally installed it is held upon the walls 10 by means of the conduit or cable clamp 1 and the securing screw 11. No bridle ring is then, as a rule, used. When, however, the traffic load upon the cable 9 becomes excessive and the telephone or telegraph engineers determine to increase the capacity of the installation, without going to the expense of taking down the cable 9 and installing a larger one, they give orders to the lineman to attach the bridle ring 8 to the conduit or cable clamp 1, so that runs of bridle wires 12, 12 may be carried by the same conduit or cable clamp. By my invention the attaching and detaching of these bridle rings 8 to the conduit or cable clamp is a very simple matter and one which can be done by simple manipulation without the use of tools of any description.

Figure 2:
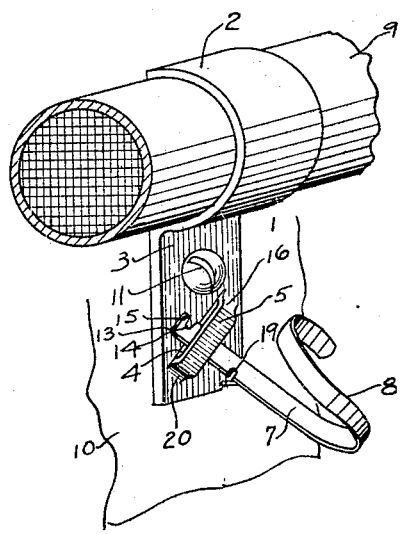
Fig. 2 is a perspective view of the conduit or cable clamp shown in Fig. 1 with the addition of the bridle ring which is shown in its first attaching position.
Figure 3:
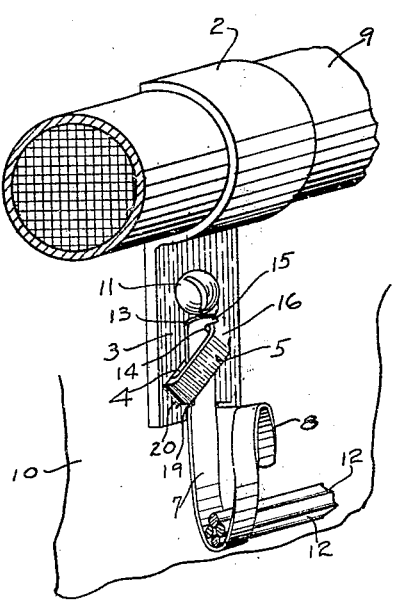
Fig. 3 is a perspective view similar to Fig. 2 but showing the bridle ring in its operative position.
Figure 4:
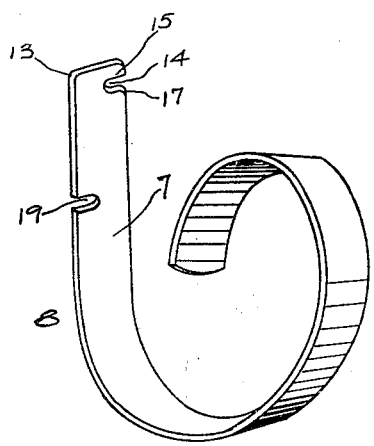
Fig. 4 is a perspective view of my preferred form of bridle ring.

The end 13 of the shank 7 is first brought to the side of the conduit or cable clamp then threaded through the diagonal pocket 4 under the diagonal strap 5, at an angle to the longitudinal axis of the clamp as shown in Fig. 2. The bridle ring is then swung down until it is parallel with the longitudinal axis of the clamp. This swinging movement will cause the jaw 15 of the hook 14 to engage over the end 16 of the strap 5 while the jaw 17 of the hook 14 will engage on the under surface of the strap 5 as shown in Fig. 3. I also, preferably, though not necessarily, provide the base 3 with a tooth 6 having a wedge surface 18. When the conduit or cable clamp is provided with such a tooth 6, the bridle ring as it is swung down from the position shown in Fig. 2 to that shown in Fig. 3, will ride up the wedge surface 18 of the tooth 6. At the same time that the hook 14 engages with the end 16 of the strap 5, the shank 7 will snap over the tooth 6. The hook 14 and the tooth 6 will securely hold the bridle ring to the conduit or cable clamp.

As an additional securing means I preferably, though not necessarily, provide the shank 7 with another hook 19. When this second hook is used, which is the preferred construction, the hook 19 will engage the other end 20 of the strap 5 and further rigidly secure the bridle ring to the conduit or cable clamp.

Should it be desired at any future time to remove the runs of bridle wires 12, 12 and the bridle ring 8, to use them in other locations, it is merely necessary to pull out on my bridle ring 8 until the shank 7 clears the tooth 6, then swing the bridle ring back into the position shown in Fig. 2, when it can be readily pulled out from under the strap 5.

It will be noted that my bridle ring is attached and detached to the conduit or cable clamp without loosening the securing screw 11.

Having thus described this invention in connection with an illustrative embodiment thereof, to the details of which I do not desire to be limited, what is claimed as new and what is desired to secure by Letters Patent is set forth in the appended claims.

What I claim is:—

1. A conduit or cable clamp provided with a hook portion to support a conduit or cable, and a base to lie against a wall or other suitable support, the base being provided with a hole for a single securing screw, said hole being beneath the hook portion, and a pocket or recess located beneath the hole for the receiving screw and arranged diagonally to the longitudinal axis of the clamp said pocket or recess being adapted to receive and coöperate and hold a bridle ring inserted from the side.

2. The combination of a conduit or cable clamp formed from sheet metal provided with a hook portion to support a conduit or cable, and a base to lie against a wall or other suitable support, the base being provided with a hole for a securing screw and with a single diagonal strap stamped up from the base, and a bridle ring having means to engage the upper and lower surfaces of said strap.

HENRY W. PLEISTER.

Witnesses:
MARY R. RYAN,
ANNA M. HEINZ.